United States Patent
Yue et al.

(10) Patent No.: US 10,958,749 B2
(45) Date of Patent: *Mar. 23, 2021

(54) METHOD AND DEVICE FOR PUSHING APPLICATION MESSAGE

(71) Applicant: Advanced New Technologies Co., Ltd., Grand Cayman (KY)

(72) Inventors: Yun Yue, Hangzhou (CN); Yutian Tao, Hangzhou (CN); Mingjie Zhong, Hangzhou (CN); Zhiyuan Cao, Hangzhou (CN); Wenhui Wu, Hangzhou (CN); Haibo Bai, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/723,676

(22) Filed: Dec. 20, 2019

(65) Prior Publication Data

US 2020/0128092 A1    Apr. 23, 2020

Related U.S. Application Data

(63) Continuation of application No. 16/254,329, filed on Jan. 22, 2019, now Pat. No. 10,812,607, which is a
(Continued)

(30) Foreign Application Priority Data

Jul. 22, 2016    (CN) .......................... 201610584814.3

(51) Int. Cl.
*H04L 29/08* (2006.01)
*H04L 12/58* (2006.01)

(52) U.S. Cl.
CPC .............. *H04L 67/26* (2013.01); *H04L 51/14* (2013.01); *H04L 51/24* (2013.01)

(58) Field of Classification Search
CPC ....... H04L 67/104; H04L 67/10; H04L 67/12; H04L 67/322; H04L 67/06; H04W 4/60; H04W 4/50; G06F 8/65; G06F 8/61
See application file for complete search history.

(56) References Cited

U.S. PATENT DOCUMENTS

2009/0191902 A1*  7/2009 Osborne ................. H04L 51/18
                                                            455/466
2010/0322124 A1   12/2010 Luoma et al.
(Continued)

FOREIGN PATENT DOCUMENTS

CN        102801817        11/2012
CN        103378978        10/2013
(Continued)

OTHER PUBLICATIONS

European Extended Search Report in European Application No. 17830480.4, dated Jun. 21, 2019, pp. 7.
(Continued)

*Primary Examiner* — Soe Hlaing
(74) *Attorney, Agent, or Firm* — Fish & Richardson P.C.

(57) ABSTRACT

A label of a message to be sent is detected as a message label for a non-real-time transmission. For a user device group associated with the message to be sent and based on a timely-response rate and a correction scheme, an optimal time period to respond to a message for each user device in the user device group is dynamically determined. Based on the optimal time period for each user device to respond to a message, the message to be sent is separately sent to a corresponding user device in the user device group.

18 Claims, 8 Drawing Sheets

Related U.S. Application Data continuation of application No. PCT/CN2017/093534, filed on Jul. 19, 2017.

(56) References Cited

U.S. PATENT DOCUMENTS

| | | |
|---|---|---|
| 2015/0169698 A1 | 6/2015 | Jia et al. |
| 2015/0222583 A1 | 8/2015 | Zhang |
| 2016/0014057 A1 | 1/2016 | Gudla et al. |
| 2017/0118304 A1* | 4/2017 | Ratiu .................. H04L 67/42 |
| 2019/0173968 A1 | 6/2019 | Yue et al. |

FOREIGN PATENT DOCUMENTS

| | | |
|---|---|---|
| CN | 105099870 | 11/2015 |
| CN | 105610929 | 5/2016 |
| CN | 106899488 | 6/2017 |
| KR | 20100000576 | 1/2010 |
| KR | 20100000576 A * | 6/2010 |
| KR | 20120026563 | 3/2012 |
| WO | WO 2015085706 | 6/2015 |

OTHER PUBLICATIONS

International Search Report by the International Searching Authority issued in International Application No. PCT/CN2017/093534 dated Oct. 10, 2017; 14 pages.

PCT International Preliminary Report on Patentability in International Application No. PCT/CN2017/093534, dated Jan. 22, 2019, 11 pages (with English translation).

PCT Written Opinion of the International Searching Authority in International Application No. PCT/CN2017/093534, dated Oct. 10, 2017, 10 pages (with English Translation).

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

* cited by examiner

METHOD AND DEVICE FOR PUSHING APPLICATION MESSAGE

CROSS-REFERENCE TO RELATED APPLICATIONS

This application is a continuation of U.S. application Ser. No. 16/254,329, filed Jan. 22, 2019, which is a continuation of PCT Application No. PCT/CN2017/093534, filed on Jul. 19, 2017, which claims priority to Chinese Patent Application No. 201610584814.3, filed on Jul. 22, 2016, and each application is hereby incorporated by reference in its entirety.

TECHNICAL FIELD

The present application relates to the field of information processing technologies, and in particular, relates to a method and device for pushing an application message.

BACKGROUND

Currently, smartphones usually have push notification functions. Various applications installed on smartphones usually send promotions or service messages such as merchandise promotion messages, viral videos, and information to users over the smartphones in batch, to increase click rate of the applications. In an existing method for pushing messages in batch, basically, content to be pushed is selected and is sent in batch at a sending time designated by back-end configuration personnel, and all users receive the pushed content almost at the same time.

However, in the existing method for pushing messages in batch, whether the users actually tap to read these received messages is not considered. Assume that the users receive the messages during work or meetings and do not tap these messages in a short time, the users possibly forget these received messages over time, and therefore do not tap to read these messages. As a result, a purpose of increasing the click rate of the various applications by pushing messages cannot be achieved.

Therefore, the existing method for pushing messages in batch has a relatively low timely response rate, thereby compromising effectiveness of the messages hitting target users.

SUMMARY

In view of this, the present application provides a method and device for pushing an application message, to alleviate a problem that an existing method for pushing messages in batch has a relatively low timely response rate.

To alleviate the technical problem above, a first aspect of the present application provides a method for pushing an application message, including: detecting that a label of a message to be sent is a message label for non-real-time transmission; for a user device group of the message to be sent, dynamically determining, based on a timely-response rate and a correction scheme, an optimal time period for each user device in the user device group to respond to a message; and based on the optimal time period for each user device to respond to a message, separately sending, to a corresponding user device in the user device group, the message to be sent.

Optionally, the dynamically determining, based on a timely-response rate and a correction scheme, an optimal time period for each user device in the user device group to respond to a message includes the following: predetermining a time interval for collecting statistics on the timely-response rate; based on the predetermined time interval, collecting statistics on a number of messages that are received by and a number of messages that are responded to in time by each user device in each time interval; determining a timely-response rate of each user device in each time interval based on the number of messages that are received by and the number of messages that are responded to in time by each user device in each time interval; determining a time interval corresponding to a maximum value of the timely-response rate as the optimal time period; correcting the determined timely-response rate of each user device in each time interval by using the predetermined correction scheme, to minimize a fluctuation amplitude of the timely-response rate; and correspondingly determining a time interval corresponding to a maximum value of the corrected timely-response rate as the optimal time period.

Optionally, if there are multiple maximum values of the timely-response rate of the user device, the method further includes the following: separately obtain time intervals corresponding to the multiple maximum values of the timely-response rate, and determine an earliest time interval as the optimal time period for the user device to respond to a message; or determine a time interval with an optimal network status as the optimal time period for the user device to respond to a message.

Optionally, the method further includes the following: dividing the user device group into a first user device group and a second user device group based on a predetermined ratio; based on an optimal time period for each user device in the first user device group to respond to a message, separately sending, to a corresponding user device in the first user device group, the message to be sent; and randomly sending, to each user device in the second user device group, the message to be sent.

Optionally, the method further includes the following: collecting statistics on a timely-response rate of each user device in the first user device group in the optimal time period and on a timely-response rate of each user device in the second user device group; and re-determining the optimal time period for each user device in the user device group when it is found by comparison that a difference between the timely-response rate of each user device in the first user device group in the optimal time period and the timely-response rate of each user device in the second user device group is less than or equal to a predetermined difference threshold.

Optionally, the method further includes the following: when determining that the user device group has a user device whose timely-response rate in the optimal time period is lower than a predetermined timely-response rate threshold, re-determining the optimal time period for the user device to respond to a message.

Optionally, the method further includes the following: detecting that the label of the message to be sent is a message label for real-time transmission; and sending, to each user device in the user device group in real time, the message to be sent.

Optionally, the separately sending, to a corresponding user device in the user device group, the message to be sent includes the following::based on an identifier of each user device in the user device group, determining an identifier of a sending server corresponding to the identifier of each user device, so that the sending server sends, to the corresponding user device, the message to be sent.

A second aspect of the present application provides a device for pushing an application message, including: a detection module, configured to detect that a label of a message to be sent is a message label for non-real-time transmission; a determining module, configured to, for a user device group of the message to be sent, dynamically determine, based on a timely-response rate and a correction scheme, an optimal time period for each user device in the user device group to respond to a message; and a sending module, configured to, based on the optimal time period for each user device to respond to a message, separately send, to a corresponding user device in the user device group, the message to be sent.

Optionally, the device further includes the following: a predetermining module, configured to predetermine a time interval for collecting statistics on the timely-response rate; a statistics analysis module, configured to collect, based on the time interval predetermined by the predetermining module, statistics on a number of messages that are received by and a number of messages that are responded to in time by each user device in each time interval; where the determining module is configured to determine a timely-response rate of each user device in each time interval based on the number of messages that are received by and the number of messages that are responded to in time by each user device in each time interval, where the numbers are obtained by the statistics analysis module through statistics collection; and the determining module is configured to determine a time interval corresponding to a maximum value of the timely-response rate as the optimal time period; and a correction module, configured to correct, by using the predetermined correction scheme, the timely-response rate of each user device in each time interval that is determined by the determining module, to minimize a fluctuation amplitude of the timely-response rate; where the determining module is configured to determine a time interval corresponding to a maximum value of the timely-response rate corrected by the correction module as the optimal time period.

Optionally, if there are multiple maximum values of the timely-response rate of the user device, the determining module is further configured to separately obtain time intervals corresponding to the multiple maximum values of the timely-response rate, and determine an earliest time interval as the optimal time period for the user device to respond to a message; or determine a time interval with an optimal network status as the optimal time period for the user device to respond to a message.

Optionally, the device further includes the following: a group division module, configured to randomly divide the user device group into a first user device group and a second user device group based on a predetermined ratio; where the sending module is further configured to, based on an optimal time period determined by the determining module for each user device in the first user device group to respond to a message, separately send, to a corresponding user device in the first user device group, the message to be sent; and the sending module is further configured to randomly send, to each user device in the second user device group, the message to be sent.

Optionally, the statistics analysis module is further configured to collect statistics on a timely-response rate of each user device in the first user device group in the optimal time period and on a timely-response rate of each user device in the second user device group; and the device further includes the following: a comparison module, configured to use the determining module to re-determine the optimal time period for each user device in the user device group when it is found by comparison that a difference between the timely-response rate of each user device in the first user device group in the optimal time period and the timely-response rate of each user device in the second user device group is less than or equal to a predetermined difference threshold.

Optionally, the determining module is further configured to re-determine the optimal time period for the user device to respond to a message, when determining that the user device group has a user device whose timely-response rate in the optimal time period is lower than a predetermined timely-response rate threshold.

Optionally, the detection module is further configured to detect that the label of the message to be sent is a message label for real-time transmission; and the sending module is further configured to send, to each user device in the user device group in real time, the message to be sent.

The present application further provides an application back-end server, including the device for pushing an application message according to the second aspect.

In implementations of the present invention, based on a user device group of a message to be sent, an optimal time period for each user device in the user device group to respond to a message is determined, that is, the highest-probability time period for tapping a message by each user is obtained. The message to be sent is separately sent to a corresponding user device in the user device group based on the optimal time period for each user device to respond to a message (that is, the highest-probability time period for tapping a message by the user), so that different users receive, at different time points, messages pushed by a system, thereby maximizing a probability of a user tapping a message. In the present invention, a time point preference for tapping a message by a user is considered, and a time point for receiving a message by the user is customized. By customizing a time point for pushing a message, a probability of a user tapping a message is maximized, thereby improving effectiveness of the message in hitting a target user. Therefore, a problem that a method for pushing messages in batch in the existing technology has a relatively low timely-response rate can be alleviated.

In the present invention, a change to a time point preference for tapping a message by a user can be further considered, and an optimal time period for a user device to respond to a message can be adaptively corrected, to ensure effectiveness of a message in hitting a target user.

Certainly, not all of the earlier mentioned advantages necessarily need to be achieved by any product that implements the present application.

BRIEF DESCRIPTION OF DRAWINGS

The accompanying drawings here are used to provide further understanding of the present application, and constitute a part of the present application. Example implementations of the present application and descriptions of the implementations are used to explain the present application, and do not constitute an improper limitation to the present application. In the accompanying drawings.

DESCRIPTION OF IMPLEMENTATIONS

Figure 1:
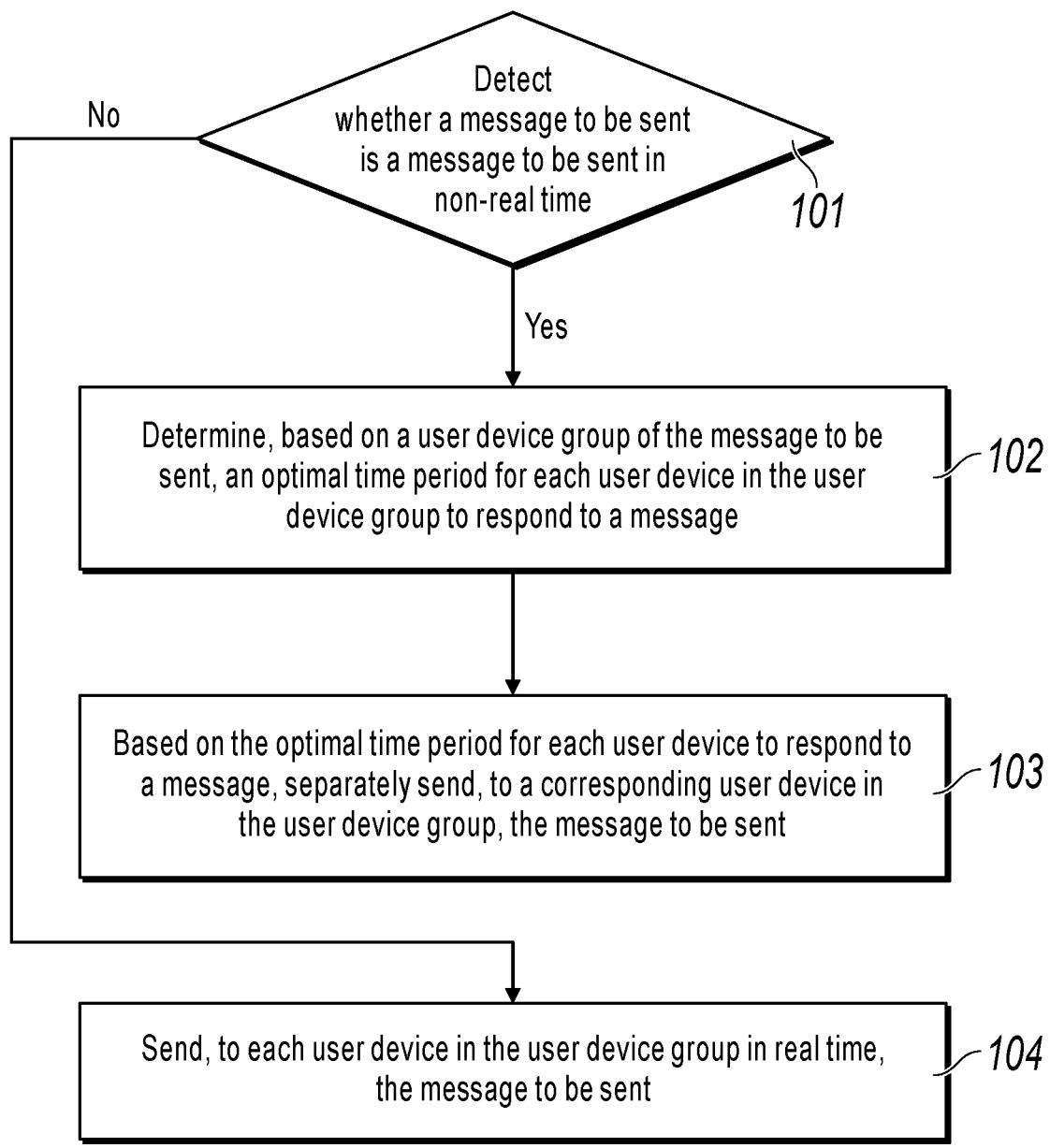
FIG. 1 is a schematic flowchart illustrating a method for pushing an application message, according to an implementation of the present application.

The implementing implementation method of the present application is described in detail below with reference to the accompanying drawings and implementations to fully understand and implement, so that an implementation process in the present application of alleviating the technical problems and achieving the technical effects by applying technical means can be fully understood and implemented.

To alleviate a problem of a low timely response rate, one day is divided into several time periods in the existing technology. The numbers of browsing times in different time periods are compared based on a number of message browsing times of a user in each time period. A time period with the largest number of browsing times is set as a time period of the highest priority. Further, it is determined whether a time when a terminal receives a message falls within the time period of the highest priority, and if yes, the received message is pushed to the user in real time, or otherwise pushing the message to the user is delayed. However, in a process of implementing the present invention, the inventor finds that the existing technology has the following problems:

First, during the setting of the time period of the highest priority, only the time period with the largest number of browsing times of the user is set as an optimal time period. However, browsing by the user is subject to whether the message is received currently. It is possible that the user is idle at present but the terminal receives no message and the user does not perform browsing. Therefore, in the existing technology, the setting of the time period of the highest priority cannot accurately reflect a preference for tapping a message by the user. Moreover, in the existing technology, once the time period of the highest priority is set, the user receives, only in the time period of the highest priority, a received message pushed by the terminal. When a habit of the user is changed, the time period of the highest priority cannot be adaptively adjusted.

Second, in the existing technology, the terminal (for example, a mobile phone) receives messages generated by various application back ends or operating systems, and then pushes the received messages to the user in the time period of the highest priority set above. Therefore, message pushing is performed by the terminal. However, the messages are generated not only by the operating systems but also by various application back ends, and it is difficult for the terminal to differentiate between messages with a high timeliness requirement and messages with a low timeliness requirement. For example, messages with a high timeliness requirement such as breaking news and a dynamic account reminder of a payment transaction need to be pushed by the terminal to the user immediately. In the existing technology, once the time period of the highest priority is set, the user receives, only in the time period of the highest priority, a received message pushed by the terminal. As such, a message with a high timeliness requirement cannot be pushed to the user in real time, and therefore the user misses the important message requiring timeliness.

Therefore, in the existing technology, setting the time period of the highest priority is lack of an adaptive-adjustment mechanism (which means inflexible), and cannot accurately reflect a preference for tapping a message by a user, and therefore the user can miss an important message requiring timeliness.

In the present invention, to alleviate the above-mentioned problem in the existing technology, a time point preference for tapping a message by each user is adaptively adjusted by using the adaptive-adjustment mechanism. As such, a time point for receiving a message by a user can be customized. A message is pushed to the user at the customized time point for receiving a message by the user, and therefore a probability of the user tapping a message is maximized, improving effectiveness of the message in hitting a target user.

Implementation 1

FIG. 1 is a schematic flowchart illustrating a method for pushing an application message, according to an implementation of the present application. As shown in FIG. 1, the method includes the following steps:

101: Detect whether a message to be sent is a message to be sent in non-real time.

In the implementation of the present invention, each message includes a message label. The message label includes a message label for non-real-time transmission and a message label for real-time transmission. Therefore, based on a message label included in the message, when the message label is the message label for non-real-time transmission, it can be determined that the message to be sent is a message to be sent in non-real time; or when the message label is the message label for real-time transmission, it can be determined that the message to be sent is a message to be sent in real time.

When it is detected that the message to be sent is a message to be sent in non-real time, step 102 is executed. When it is detected that the message to be sent is a message to be sent in real time, step 104 is executed.

102: For a user device group of the message to be sent, dynamically determine, based on a timely-response rate and a correction scheme, an optimal time period for each user device in the user device group to respond to a message.

In the implementation of the present invention, for example, the user device can be a smartphone, a PDA (tablet computer), a PC-tablet two-in-one, etc. The user device can have a wired network interface, and can also have a wireless network interface.

For example, the back end of TAOBAO (an application (APP) in a mobile phone) needs to send merchandise promotion messages to user's mobile phones in batch. A large number of user's mobile phones have TAOBAOAPP installed. Here, the user's mobile phone is a type of user device. Therefore, in the implementation of the present invention, the user's mobile phones are referred to as a user device group.

To maximize a probability of tapping the merchandise promotion message by a user, a time point preference for tapping a message by each user in a user group needs to be obtained in the implementation of the present invention. It is worthwhile to note that, when a user device receives the merchandise promotion message sent by the back end of TAOBAO APP, a user taps the merchandise promotion message by using the user device, that is, the user device responds to the merchandise promotion message. Therefore, the determining the optimal time period for each user device in the user device group to respond to a message in step 102 is essentially obtaining the time point preference for tapping a message by each user in the user group.

Current message pushing by mobile phones in batch (excluding a message triggered in real time by an event rule) all starts from a certain specified time point T, and actual reaching to users depends on the time point T and a time needed for system pushing processing. Because a probability of a user tapping a message decreases exponentially as the time elapses after the message is received, that is, most users tap the message within a short time after the message is received (generally within half an hour), whether the user will tap the message is strongly correlated to the time point when the user receives the message. In the present invention, the time point preference for receiving a message by a user is considered so that messages pushed in batch can be received by different users at different time point, that is, the time point preference for tapping a message by each user is adaptively adjusted. As such, a time point for receiving a message by a user can be customized. A message is pushed to the user at the customized time point for receiving a message by the user, and therefore a probability of the user tapping a message is maximized, improving effectiveness of the message in hitting a target user.

In the implementation of the present invention, statistics can be collected on messages that are received by and messages that are tapped by each mobile user of TAOBAO (which is equivalent to a user device having mobile TAOBAO installed) in history (for example, in recent one year), to obtain through analysis the highest-probability time period for tapping a message by each mobile user of TAOBAO (which is equivalent to an optimal time period for responding to a message).

Figure 2:
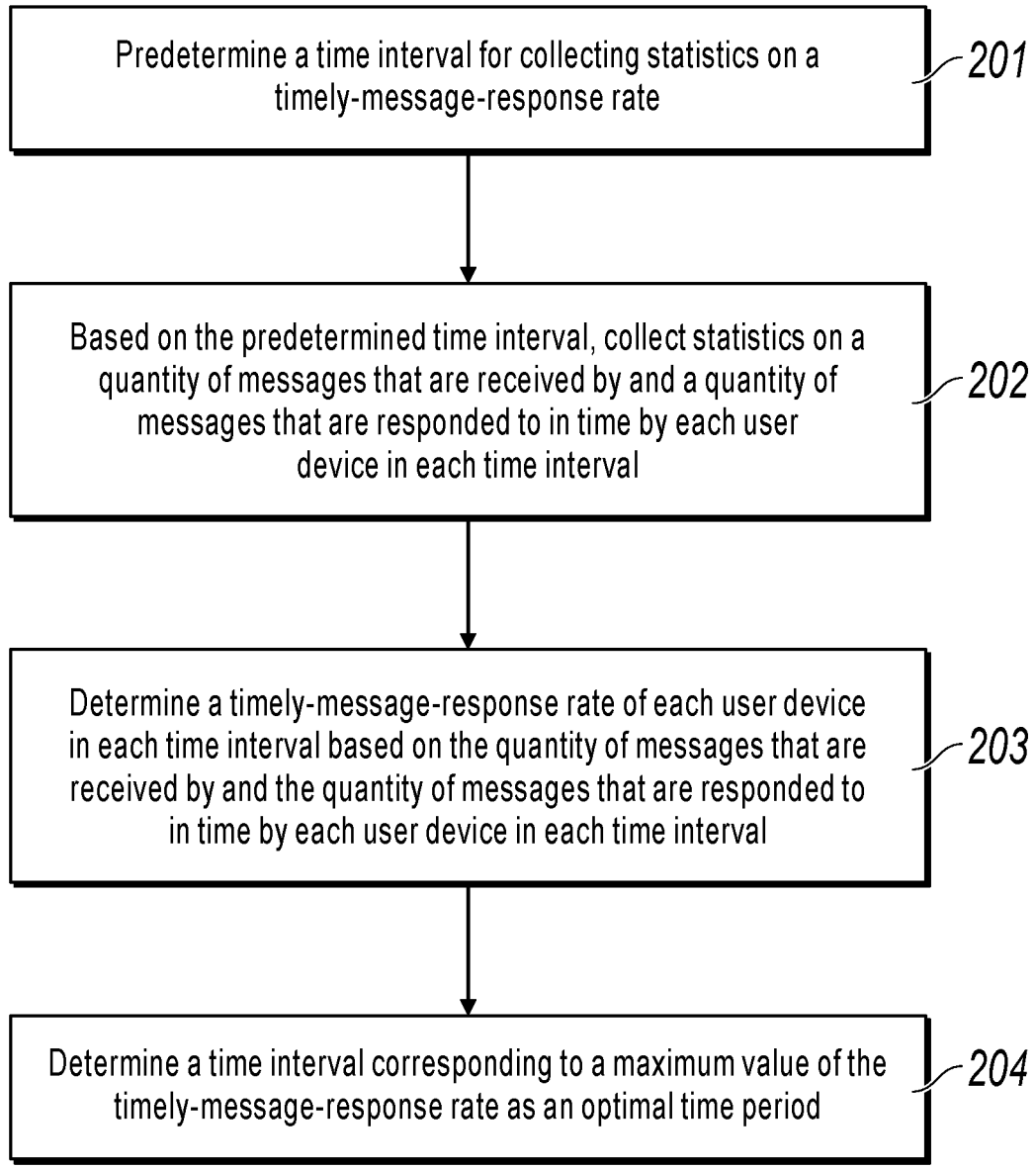
FIG. 2 is a schematic flowchart illustrating an implementation method of step 102 in the implementation shown in FIG. 1.
Figure 3:
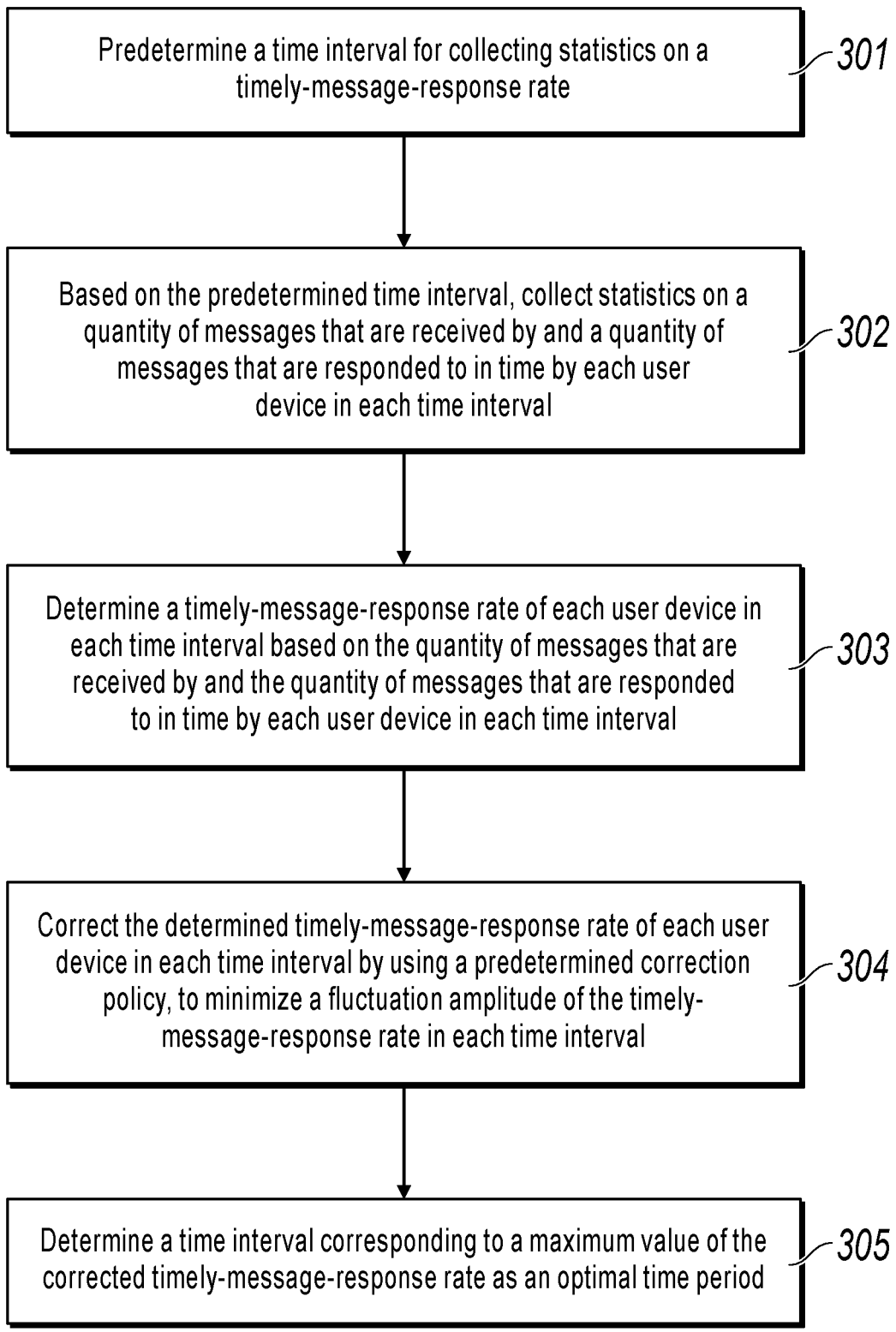
FIG. 3 is a schematic flowchart illustrating another implementation method of step 102 in the implementation shown in FIG. 1.

For implementation of step 102, references can be made to detailed descriptions in implementations shown in FIG. 2 and FIG. 3.

103: Based on the optimal time period for each user device to respond to a message, separately send, to a corresponding user device in the user device group, the message to be sent.

Based on the highest-probability time period for tapping a message by each mobile user of TAOBAO (which is equivalent to the optimal time period for responding to a message) obtained above through analysis, the back end of TAOBAO APP separately sends the merchandise promotion message to a corresponding mobile user of TAOBAO in the corresponding highest-probability time period (optimal time period). For example, assume that the highest-probability time period (optimal time period) obtained through analysis for user A to tap the merchandise promotion message sent by the back end of TAOBAO APP is from 12:00 to 12:10 at noon. In this case, the back end of TAOBAO APP sends the merchandise promotion message to a user device used by user A during 12:00 to 12:10 at noon so that user A can tap the message soon after receiving the message, thereby improving effectiveness of the message in hitting a target user.

104: Send, to each user device in the user device group in real time, the message to be sent.

In the implementation of the present invention, based on a user device group of a message to be sent, an optimal time period for each user device in the user device group to respond to a message is determined, that is, the highest-probability time period for tapping a message by each user is obtained. The message to be sent is separately sent to a corresponding user device in the user device group based on the optimal time period for each user device to respond to a message (that is, the highest-probability time period for tapping a message by the user), so that different users receive, at different time points, messages pushed by a system, thereby maximizing the probability of a user tapping a message. In the present invention, a time point preference for tapping a message by a user is fully considered, and a time point for receiving a message by the user is customized. By customizing a time point for pushing a message, the probability of a user tapping a message is maximized, thereby improving effectiveness of the message in hitting a target user. Therefore, a problem that a method for pushing messages in batch in the existing technology has a relatively low timely-response rate can be alleviated.

FIG. 2 is a schematic flowchart illustrating an implementation method of step 102 in the implementation shown in FIG. 1. As shown in FIG. 2, in the implementation of the present invention, the determining an optimal time period for each user device in the user device group to respond to a message can include the following steps:

201: Predetermine a time interval for collecting statistics on a timely-response rate.

To more accurately determine the optimal time period for responding to a message, the time interval for collecting statistics on the timely-response rate can be set to a relatively small value in the implementation of the present invention. For example, each day is divided into n time intervals based on a fixed time interval $\Delta t$, for example, a time interval is set to 15 minutes, and one day is divided into 96 time intervals. In this case, $\Delta t=15$ minutes, and $n=96$.

202: Based on the predetermined time interval, collect statistics on a number of messages that are received by and a number of messages that are responded to in time by each user device in each time interval.

In the present step, statistics are collected on messages that are received by and messages that are tapped by a user in history. To more accurately determine the optimal time period for responding to a message, it is better to collect statistics on more samples (messages that are received by and messages that are tapped by the user in history), for example, statistics can be collected on messages that are received by and messages that are tapped by the user in recent one year. During statistics collection, statistics are collected on a number of messages that are received by and a number of messages that are responded to in time by each user device in each time interval in recent one year.

Because the user receives different numbers of messages and taps different numbers of messages in working days and holidays, and taps the messages in different time periods, statistics can be collected differently for the working days and holidays during statistics collection.

203: Determine a timely-response rate of each user device in each time interval based on the number of messages that are received by and the number of messages that are responded to in time by each user device in each time interval.

Based on the number of messages that are received by and the number of messages that are responded to in time by each user device in each time interval, where the numbers are obtained through statistics collection in step 202, the timely-response rate of each user device in each time interval can be obtained by dividing the number of messages that are received by each user device in each time interval by the number of messages that are responded to in time by the user device in the time interval.

204: Determine a time interval corresponding to a maximum value of the timely-response rate as the optimal time period.

Generally, a high timely-response rate in a certain time interval indicates a high probability of tapping a message in time after a user receives the message in the time interval. Therefore, based on the timely-response rate of each user device in each time interval obtained in step 203, the time interval corresponding to the maximum value of the timely-response rate can be determined as the optimal time period for the user device to respond to a message.

FIG. 3 is a schematic flowchart illustrating another implementation method of step 102 in the implementation shown in FIG. 1. As shown in FIG. 3, in the implementation of the present invention, it is considered that the numbers of messages that are received by a user device in time intervals possibly vary greatly. As a result, a fluctuation amplitude of the timely-response rate in each time interval is large, and accurate determining of the optimal time period for each user device to respond to a message is affected. Therefore, the timely-response rate in each time interval needs to be corrected in the implementation of the present invention. Step 102 can include the following steps.

301: Predetermine a time interval for collecting statistics on the timely-response rate.

To more accurately determine the optimal time period for responding to a message, the time interval for collecting statistics on the timely-response rate can be set to a relatively small value in the implementation of the present invention. For example, each day is divided into n time intervals based on a fixed time interval $\Delta t$, for example, a time interval is set to 15 minutes, and one day is divided into 96 time intervals. In this case, $\Delta t$=15 minutes, and n=96.

302: Based on the predetermined time interval, collect statistics on a number of messages that are received by and a number of messages that are responded to in time by each user device in each time interval.

In the present step, statistics are collected on messages that are received by and messages that are tapped by a user in history. To more accurately determine the optimal time period for responding to a message, it is better to collect statistics on more samples (messages that are received by and messages that are tapped by the user in history), for example, statistics can be collected on messages that are received by and messages that are tapped by the user in recent one year. During statistics collection, statistics are collected on a number of messages that are received by and a number of messages that are responded to in time by each user device in each time interval in recent one year.

Because the user receives different numbers of messages and taps different numbers of messages in working days and holidays, and taps the messages in different time periods, statistics can be collected differently for the working days and holidays during statistics collection.

303: Determine a timely-response rate of each user device in each time interval based on the number of messages that are received by and the number of messages that are responded to in time by each user device in each time interval.

Based on the number of messages that are received by and the number of messages that are responded to in time by each user device in each time interval, where the numbers are obtained through statistics collection in step 302, the timely-response rate of each user device in each time interval can be obtained by dividing the number of messages that are received by each user device in each time interval by the number of messages that are responded to in time by the user device in the time interval.

304: Correct the determined timely-response rate of each user device in each time interval by using a predetermined correction scheme, to minimize a fluctuation amplitude of the timely-response rate in each time interval.

In the implementation of the present invention, for example, the predetermined correction scheme can be performing correction by using the Wilson interval. For example, a user receives 10 messages and taps 6 messages in time interval 1, and receives 100 messages and taps 60 messages in time interval 2. Calculated tapping probabilities are both 0.6. After correcting by using the Wilson interval, the tapping probabilities of the user in time interval 1 and time interval 2 are respectively 0.31 and 0.50 (a lower limit of a normal distribution confidence interval with a confidence value of 0.95), that is, it is considered that the tapping probability of time interval 2 that is calculated by using a frequency is more stable and has a smaller fluctuation amplitude.

305: Determine a time interval corresponding to a maximum value of the corrected timely-response rate as the optimal time period.

It is worthwhile to note that, assume that there are multiple maximum values of the timely-response rate of the user device in FIG. 2 and FIG. 3 above. To more accurately determine the optimal time period for the user device to respond to a message, for example, time intervals corresponding to the multiple maximum values of the timely-response rate can be separately obtained in the implementation of the present invention, and an earliest time interval can be determined as the optimal time period for the user device to respond to a message. For another example, a time interval with an optimal network status can further be determined as the optimal time period for the user device to respond to a message.

Implementation 2

Figure 4:
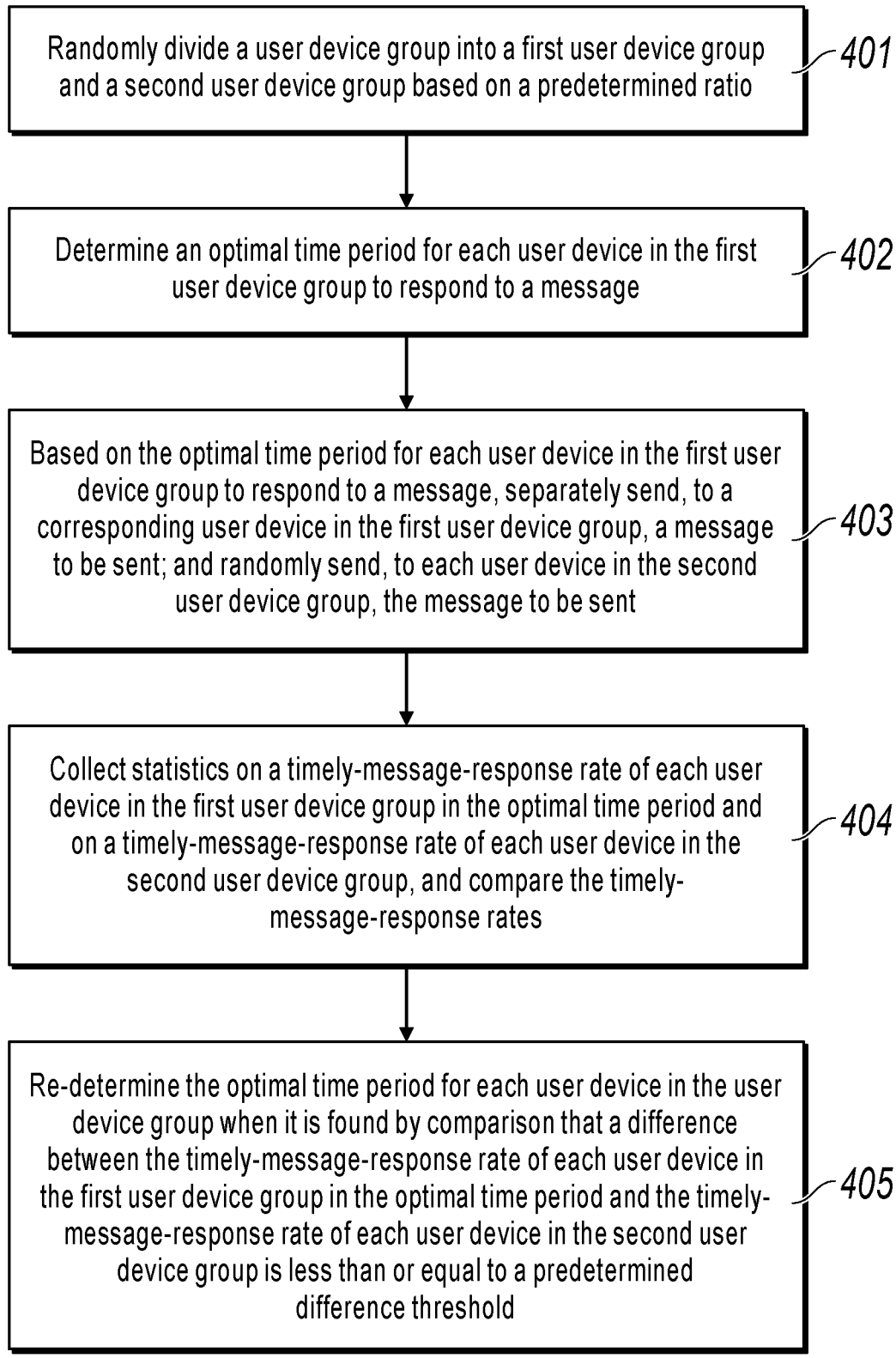
FIG. 4 is a schematic flowchart illustrating a method for pushing an application message, according to an implementation of the present application.

FIG. 4 is a schematic flowchart illustrating a method for pushing an application message, according to an implementation of the present application. As shown in FIG. 4, it is considered that a time point preference for tapping a message by a user is changed. To ensure effectiveness of a message in hitting a target user, in the implementation of the present invention, a user device group is randomly divided into groups based on a predetermined ratio. For one user device group, a message is pushed in an optimal time period for responding to a message. For another user device group, a message is pushed at a randomly selected time point. Then, effects of responding to the message by user devices in the two groups are compared. Based on the effect comparison or feedback information from the user devices in the two groups on a message pushing time, it is determined whether to re-calculate the optimal time period for the user devices to respond to a message. Detailed implementation includes the following steps:

401: Randomly divide the user device group into a first user device group and a second user device group based on a predetermined ratio.

User A can possibly be assigned to the first user device group or the second user device group at each time of pushing.

402: Determine an optimal time period for each user device in the first user device group to respond to a message.

403: Based on the optimal time period for each user device in the first user device group to respond to a message, separately send, to a corresponding user device in the first user device group, a message to be sent; and randomly send, to each user device in the second user device group, the message to be sent.

404: Collect statistics on a timely-response rate of each user device in the first user device group in the optimal time period and on a timely-response rate of each user device in the second user device group, and compare the timely-response rates.

405: Re-determine the optimal time period for each user device in the user device group when it is found by comparison that a difference between the timely-response rate of each user device in the first user device group in the optimal time period and the timely-response rate of each user device in the second user device group is less than or equal to a predetermined difference threshold.

For this, a timely-response rate difference threshold can further be predetermined in the implementation of the present invention. When it is found by comparison that the difference between the timely-response rate of each user device in the first user device group in the optimal time period and the timely-response rate of each user device in the second user device group is less than or equal to the predetermined difference threshold, it indicates that the optimal time period for the user device to respond to a message obtained above through statistics collection has a problem, and needs to be re-determined.

It is worthwhile to note that, a timely-response rate threshold can further be predetermined in the implementation of the present invention. When it is determined that the user device group has a user device whose timely-response rate in the optimal time period is lower than the predetermined timely-response rate threshold, the optimal time period for the user device to respond to a message needs to be re-determined, and it indicates that a time point preference for tapping a message by a user of the user device is possibly changed. When the time point preference for tapping a message by the user is changed, the optimal time period for the user device to respond to a message can be adjusted in time in the implementation of the present invention, thereby ensuring accuracy of the optimal time period for the user device to respond to a message.

In the implementation of the present invention, the user device group is randomly divided into groups based on the predetermined ratio. For one user device group, a message is pushed in an optimal time period for responding to a message. For another user device group, a message is pushed at a randomly selected time point. Then, effects of responding to the message by user devices in the two groups are compared. Based on the effect comparison or feedback information from the user devices in the two groups on a message pushing time, it is determined whether to re-calculate the optimal time period for the user devices to respond to a message. That a time point preference for tapping a message by a user is changed can be considered, and the optimal time period for the user device to respond to a message can be adaptively corrected, thereby ensuring effectiveness of a message in hitting a target user.

Implementation 3

Figure 5:
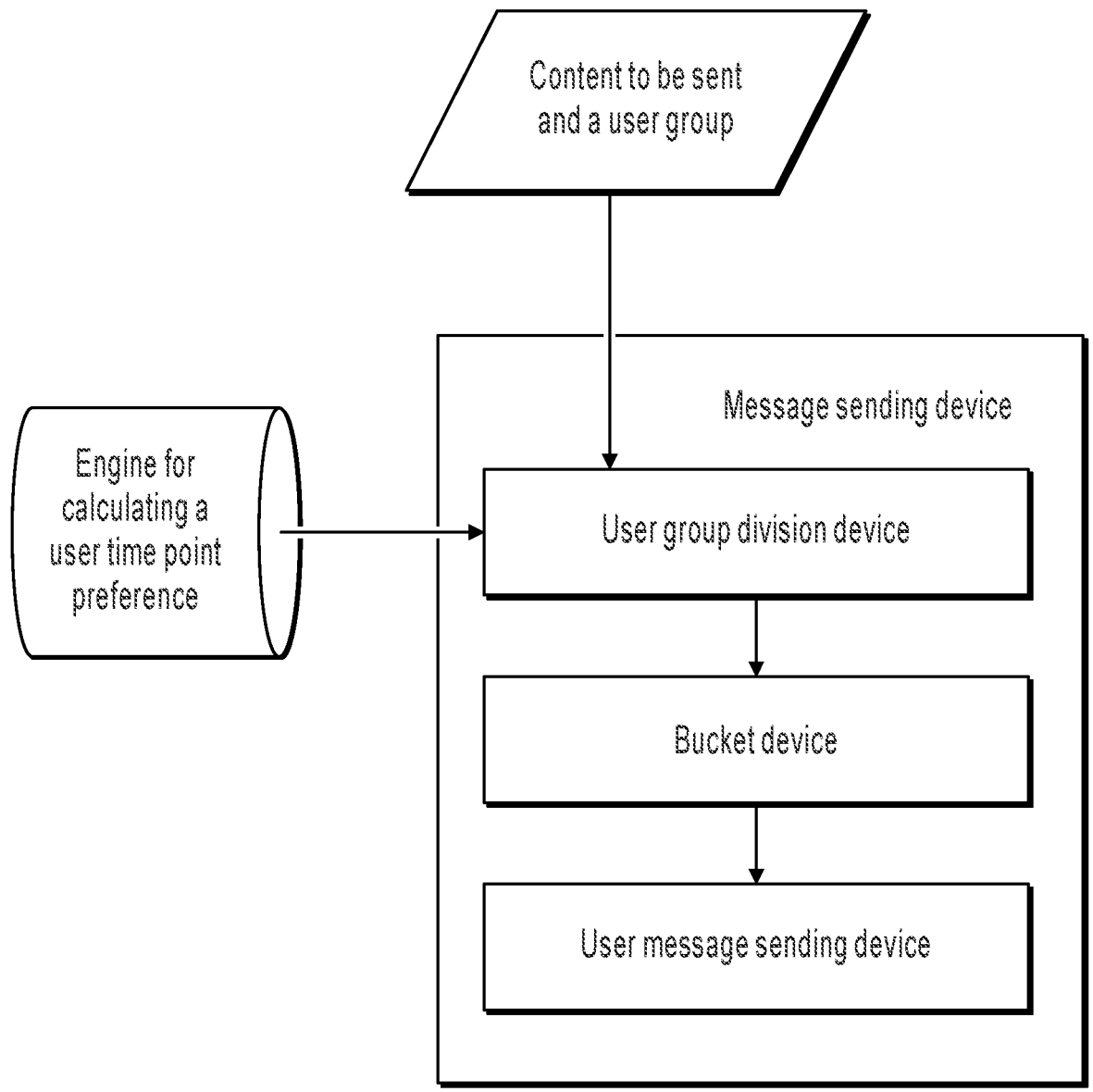
FIG. 5 is a schematic diagram illustrating an implemented function of a method for pushing an application message, according to an implementation of the present application.

FIG. 5 is a schematic diagram illustrating an implemented function of a method for pushing an application message, according to an implementation of the present application. As shown in FIG. 5, the following steps are included:

Step 1: Engine for calculating a user time point preference.

The highest-probability time interval for tapping a message by a user is calculated based on messages that are received by and messages that are tapped by the user in history (recent one year). A method is as follows:

(1) Working days and holidays are differentiated. Each day is divided into n time intervals based on a fixed time interval $\Delta t$, for example, a time interval is set to 15 minutes, and one day is divided into 96 time intervals. In this case, $\Delta t=15$, and $n=96$.

(2) Working days and holidays are differentiated. A number of messages that are received by and a number of messages that are tapped by a user in each time interval in history (recent one year here) are calculated, and a tapping probability is calculated.

(3) The Wilson interval is used for correction in consideration that the numbers of messages that are received by the user in time intervals possibly vary greatly. For example, a user receives 10 messages and taps 6 messages in time interval 1, and receives 100 messages and taps 60 messages in time interval 2. Calculated tapping probabilities are both 0.6. After correction by using the Wilson interval, the tapping probabilities of the user in time interval 1 and time interval 2 are respectively 0.31 and 0.50 (a lower limit of a normal distribution confidence interval with confidence being 0.95), that is, it is considered that the tapping probability of time interval 2 that is calculated by using a frequency is more stable and has a smaller fluctuation amplitude.

(4) Working days and holidays are differentiated. A time interval with a highest corrected tapping probability of each user is selected. A user with only sending numbers in m ($m \geq 1$) message intervals and a user with tapping numbers in all message intervals each being 0 are removed (preferred time points of the users cannot be determined). If there are multiple time intervals with a highest probability, an earliest time interval is selected.

(5) In consideration of an average latency $\Delta t'$ (a very small average latency can be ignored) from system sending to reaching to a user, a value obtained by subtracting $\Delta t'$ from a calculated preferred time point of the user can be used as a pushing time point of the user, and is pushed to a message sending device in a form of data table for storage. For example, a time point can be selected from an optimal time period as the preferred time point of the user.

Step 2: Select content to be sent and a user group.

The content to be sent can be designated by business personnel or obtained through calculation by a system. The user group can include all the users or users filtered by using a tag, for example, users of 18 to 22 years old, female users, etc.

Step 3: Send messages.

The content to be sent and the user group are pushed to the message sending device. After optimal pushing time points of users are selected, the content to be sent is sent to the users at the optimal pushing time points of the users. The following is included:

(1) User group division device: A back-end asynchronous thread divides users in the user group specified in step 2 into groups based on the time interval $\Delta t$ mentioned in step 1, with reference to the user time point preference information calculated in step 1. A user without clear time point preference information is randomly assigned to a sending time group.

(2) Bucket device: After user group division is completed, the bucket device sets a sending time of a certain proportion (for example, 20%) of users to a random sending time, to compare effects and collect more comprehensive feedback information from the users on the message sending time.

(3) User message sending device: The user message sending device starts task execution threads at a scheduled time on multiple cluster machines based on the time interval Δt through distributed concurrent scheduling and control, to concurrently query data sent to users by the bucket device in the system time period in (2), and to trigger message pushing. Here, to reduce overlapped sending tasks dedicated for the same user caused by a distributed system (for example, machines A, B, and C obtain sending tasks dedicated for user 1 at the same time point; without any processing, A, B, and C separately trigger message pushing to user 1 once), the system performs logical group division directly based on a user ID dimension and task execution machines, to ensure that only one machine is responsible for message pushing to one user. For this, based on an identifier of each user device in the user device group, an identifier of a sending server corresponding to the identifier of each user device needs to be determined in the implementation of the present invention so that the sending server sends, to a corresponding user device, the message to be sent. Detailed practice is as follows:

a. Task execution machines are logically numbered starting from 0. For example, if there are 20 task execution machines, logical numbers of the task execution machines are all integers from 0 to 19.

b. Mapping processing is performed on ID information of users based on machines numbers. In the example above, assume that an ID of user 1 is 123. Then, a modulo operation is performed on 123 by using 20 to obtain 3, indicating that the machine with the logical number 3 needs to push message to user 1.

c. All machines concurrently obtain user data to be pushed in the system time period, but process only user data that is obtained through calculation by using the algorithm mentioned in b and that falls within respective responsibility ranges, to reduce overlapped tasks while improving pushing concurrency.

According to the implementation of the present invention, a time point preference for tapping a message by a user is fully considered, and a time point for receiving a message by the user is customized. By customizing a time point for pushing a message, a probability of a user tapping a message is maximized. In addition, a change to a time point preference for tapping a message by a user can be further considered, and an optimal time period for a user device to respond to a message can be adaptively corrected, to ensure effectiveness of a message in hitting a target user.

Figure 6:
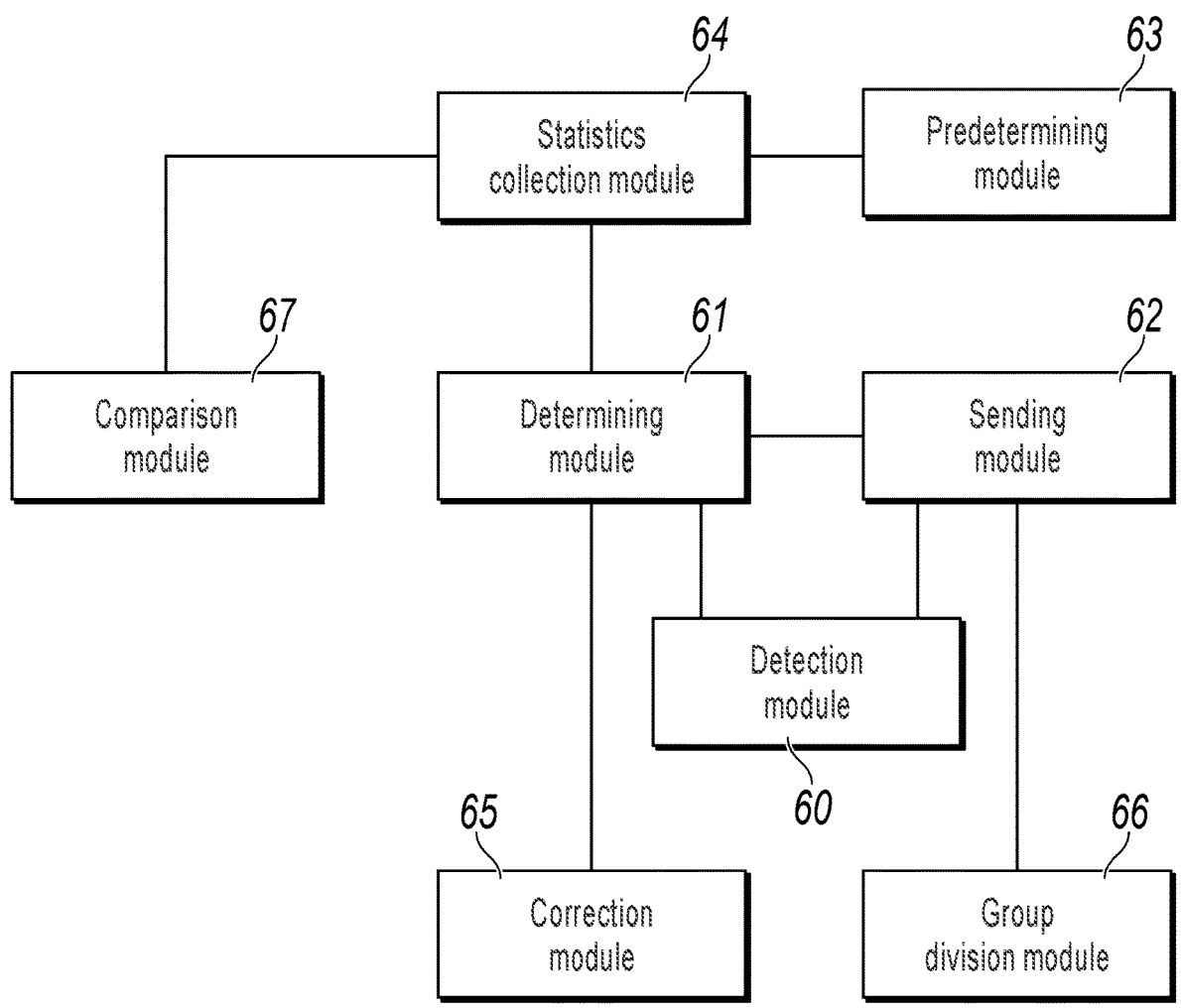
FIG. 6 is a schematic structural diagram illustrating a device for pushing an application message, according to an implementation of the present application.

FIG. 6 is a schematic structural diagram illustrating a device for pushing an application message, according to an implementation of the present application. As shown in FIG. 6, the device includes the following: a detection module 60, configured to detect that a label of a message to be sent is a message label for non-real-time transmission; a determining module 61, configured to dynamically determine, based on a timely-response rate and a correction scheme, an optimal time period for each user device in a user device group to respond to a message for the user device group of the message to be sent; and a sending module 62, configured to separately send, to a corresponding user device in the user device group, the message to be sent, based on the optimal time period for each user device to respond to a message.

The device further includes the following: a predetermining module 63, configured to predetermine a time interval for collecting statistics on the timely-response rate; and a statistics analysis module 64, configured to collect, based on the time interval predetermined by the predetermining module, statistics on a number of messages that are received by and a number of messages that are responded to in time by each user device in each time interval; where the determining module 61 is configured to determine a timely-response rate of each user device in each time interval based on the number of messages that are received by and the number of messages that are responded to in time by each user device in each time interval, where the numbers are obtained by the statistics analysis module through statistics collection; and the determining module 61 is configured to determine, a time interval corresponding to a maximum value of the timely-response rate as the optimal time period.

The device further includes the following: a correction module 65, configured to correct, by using the predetermined correction scheme, the timely-response rate of each user device in each time interval, determined by the determining module, to minimize a fluctuation amplitude of the timely-response rate; where the determining module 61 is configured to determine, a time interval corresponding to a maximum value of the timely-response rate corrected by the correction module as the optimal time period.

If there are multiple maximum values of the timely-response rate of the user device, the determining module 61 is further configured to separately obtain time intervals corresponding to the multiple maximum values of the timely-response rate, and determine an earliest time interval as the optimal time period for the user device to respond to a message; or determine a time interval with an optimal network status as the optimal time period for the user device to respond to a message.

The device further includes the following: a group division module 66, configured to randomly divide the user device group into a first user device group and a second user device group based on a predetermined ratio; where the sending module 62 is further configured to separately send the message to a corresponding user device in the first user device group based on an optimal time period determined by the determining module for each user device in the first user device group to respond to a message; and the sending module 62 is further configured to randomly send, to each user device in the second user device group, the message to be sent.

The statistics analysis module 64 is further configured to collect statistics on a timely-response rate of each user device in the first user device group in the optimal time period and on a timely-response rate of each user device in the second user device group.

The device further includes the following: a comparison module 67, configured to use the determining module 61 to re-determine the optimal time period for each user device in the user device group when it is found by comparison that a difference between the timely-response rate of each user device in the first user device group in the optimal time period and the timely-response rate of each user device in the second user device group is less than or equal to a predetermined difference threshold.

The determining module 61 is further configured to re-determine the optimal time period for the user device to respond to a message, when determining that the user device group has a user device whose timely-response rate in the optimal time period is lower than a predetermined timely-response rate threshold.

The detection module 60 is further configured to detect that the label of the message to be sent is a message label for real-time transmission; and the sending module 62 is further configured to send, to each user device in the user device group in real time, the message to be sent.

According to the device in the implementation of the present invention, a time point preference for tapping a message by a user is fully considered, and a time point for receiving a message by the user is customized. By customizing a time point for pushing a message, a probability of a user tapping a message is maximized. In addition, a change to a time point preference for tapping a message by a user can be further considered, and an optimal time period for a user device to respond to a message can be adaptively corrected, to ensure effectiveness of a message in hitting a target user.

Figure 7:
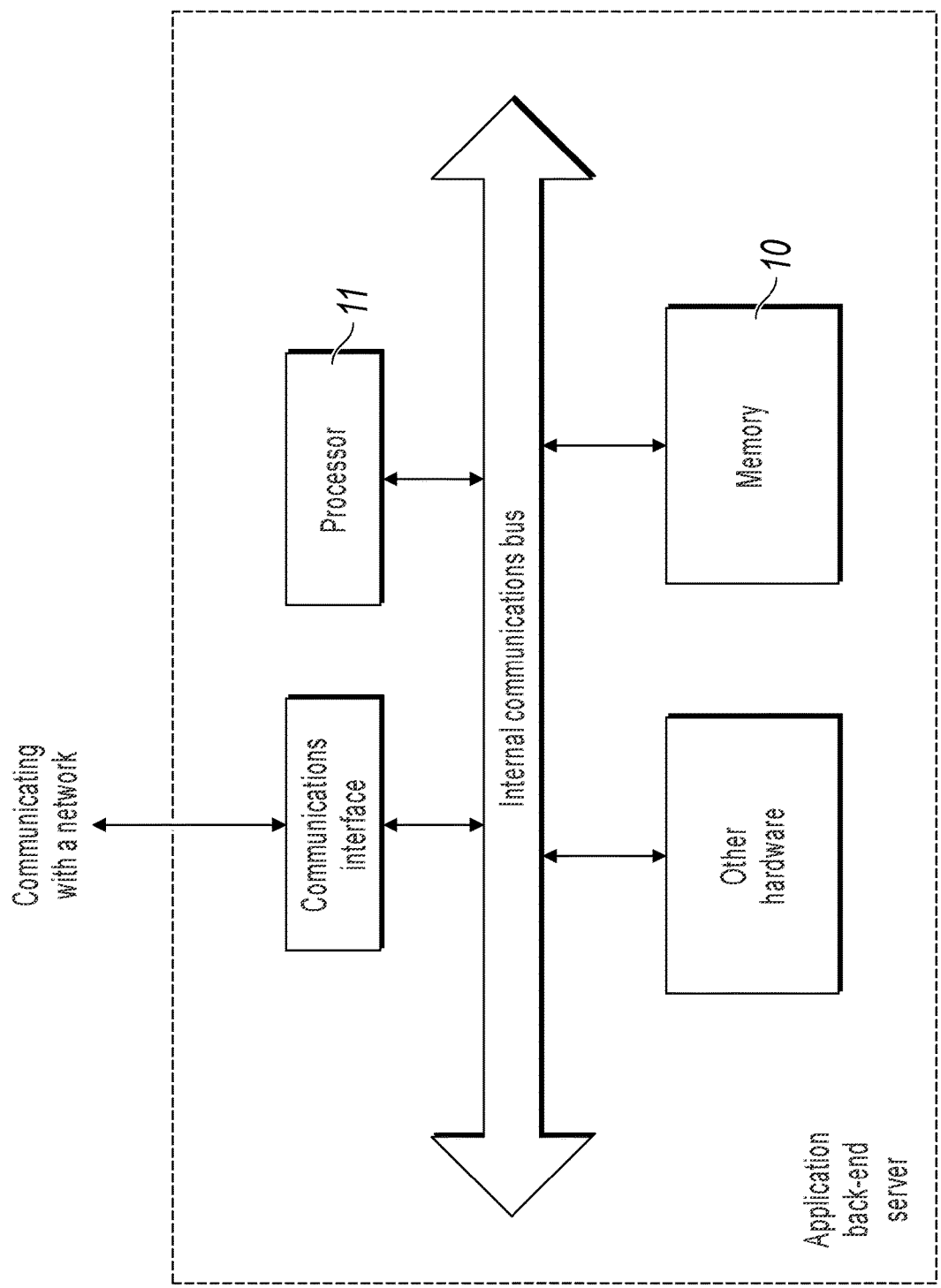
FIG. 7 is a schematic structural diagram illustrating an application back-end server, according to an implementation of the present application.

FIG. 7 is a schematic structural diagram illustrating an application back-end server, according to an implementation of the present application. The back-end server can have a wired network interface, and can also have a wireless network interface. As shown in FIG. 7, the back-end server includes a memory 10, and one or more processors 11.

The memory 10 stores an instruction for implementing the method for pushing a message in any of the implementations in FIG. 1 to FIG. 5. When invoking the instruction stored in the memory 10, the processor 11 can execute the following steps: detecting that a label of a message to be sent is a message label for non-real-time transmission; for a user device group of the message to be sent, dynamically determining, based on a timely-response rate and a correction scheme, an optimal time period for each user device in the user device group to respond to a message; and based on the optimal time period for each user device to respond to a message, separately sending, to a corresponding user device in the user device group, the message to be sent.

The determining an optimal time period for each user device in the user device group to respond to a message includes the following: predetermining a time interval for collecting statistics on the timely-response rate; based on the predetermined time interval, collecting statistics on a number of messages that are received by and a number of messages that are responded to in time by each user device in each time interval; determining a timely-response rate of each user device in each time interval based on the number of messages that are received by and the number of messages that are responded to in time by each user device in each time interval; and determining a time interval corresponding to a maximum value of the timely-response rate as the optimal time period.

After the determining a timely-response rate of each user device in each time interval, the following steps are included: correcting the determined timely-response rate of each user device in each time interval by using the predetermined correction scheme, to minimize a fluctuation amplitude of the timely-response rate; and correspondingly determining a time interval corresponding to a maximum value of the corrected timely-response rate as the optimal time period.

Optionally, if there are multiple maximum values of the timely-response rate of the user device, the processor 11 can further execute the following step: separately obtaining time intervals corresponding to the multiple maximum values of the timely-response rate, and determining an earliest time interval as the optimal time period for the user device to respond to a message; or determining a time interval with an optimal network status as the optimal time period for the user device to respond to a message.

Optionally, the processor 11 can further execute the following steps: dividing the user device group into a first user device group and a second user device group based on a predetermined ratio; based on an optimal time period for each user device in the first user device group to respond to a message, separately sending, to a corresponding user device in the first user device group, the message to be sent; randomly sending, to each user device in the second user device group, the message to be sent; and collecting statistics on a timely-response rate of each user device in the first user device group in the optimal time period and on a timely-response rate of each user device in the second user device group, and comparing the timely-response rates.

Optionally, the processor 11 can further execute the following step: when determining that the user device group has a user device whose timely-response rate in the optimal time period is lower than a predetermined timely-response rate threshold, re-determining the optimal time period for the user device to respond to a message.

The separately sending, to a corresponding user device in the user device group, the message to be sent includes the following: based on an identifier of each user device in the user device group, determining an identifier of a sending server corresponding to the identifier of each user device, so that the sending server sends, to the corresponding user device, the message to be sent.

Optionally, the processor 11 can further execute the following steps: detecting that the label of the message to be sent is a message label for real-time transmission; and sending, to each user device in the user device group in real time, the message to be sent.

According to the back-end serving device in the implementation of the present invention, a time point preference for tapping a message by a user is fully considered, and a time point for receiving a message by the user is customized. By customizing a time point for pushing a message, a probability of a user tapping a message is maximized. In addition, a change to a time point preference for tapping a message by a user can be further considered, and an optimal time period for a user device to respond to a message can be adaptively corrected, to ensure effectiveness of a message in hitting a target user.

In a typical configuration, a computing device includes one or more processors (CPU), an input/output interface, a network interface, and a memory.

The memory can include a non-persistent storage, a random access memory (RAM), a nonvolatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. Examples of a computer storage medium include but are not limited to a phase-change random access memory (PRAM), a static random access memory (SRAM), a dynamic random access memory (DRAM) or another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, a magnetic tape, a magnetic tape/magnetic disk memory or another magnetic storage device, or any other non-transmission medium that can be used to store information that can be accessed by a computing device. Based on the description in the present specification, the computer readable medium does not include a non-transitory computer readable storage medium (transitory media) such as a modulated digital signal and a carrier.

For example, certain terms are used to indicate particular components in the specification and claims. A person skilled in the art can understand that hardware manufacturers possibly use different nouns to refer the same component. In the present specification and claims, components are not distinguished by using different names, but using different component functions. For example, the word "include/comprise" used throughout the specification and claims is an open term and should be interpreted as "including/comprising but not limited to". "Substantially" means that within the range of acceptable errors, a person skilled in the art will be able to alleviate the technical problems within a certain error range, substantially achieving the technical effects. In addition, the term "coupled" is used here to include any direct and indirect electrical coupling means. Therefore, if in the specification, a first device is coupled to a second device, the first device can be directly electrically coupled to the second device, or indirectly electrically coupled to the second device through other devices or coupling means. The subsequent descriptions in the specification are preferred implementations for implementing the present application. However, the descriptions are also intended to illustrate the present application, and are not intended to limit the scope of the present application. The protection scope of the present application is subject to the description of the appended claims.

It is worthwhile to further note that the terms "include", "comprise", or their any other variant is intended to cover a non-exclusive inclusion so that an article or a system that includes a list of elements not only includes those elements but also includes other elements which are not expressly listed, or further includes elements inherent to such article or system. An element preceded by "includes a . . . " does not, without more constraints, preclude the existence of additional identical elements in the article or system that includes the element.

The above description illustrates and describes several preferred implementations of the present invention. However, as described above, it is worthwhile to understand that the present invention is not limited to the form disclosed in the specification, and the preferred implementations should not be construed as a preclusion to other implementations, but can be applicable to other combinations, modifications, and environments and can be modified by the above teachings or technologies or knowledge in related fields within the scope of the inventive concept described in the specification. All changes and modifications made by a person skilled in the art do not depart from the spirit and scope of the present invention should fall within the protection scope of the appended claims of the present invention.

Figure 8:
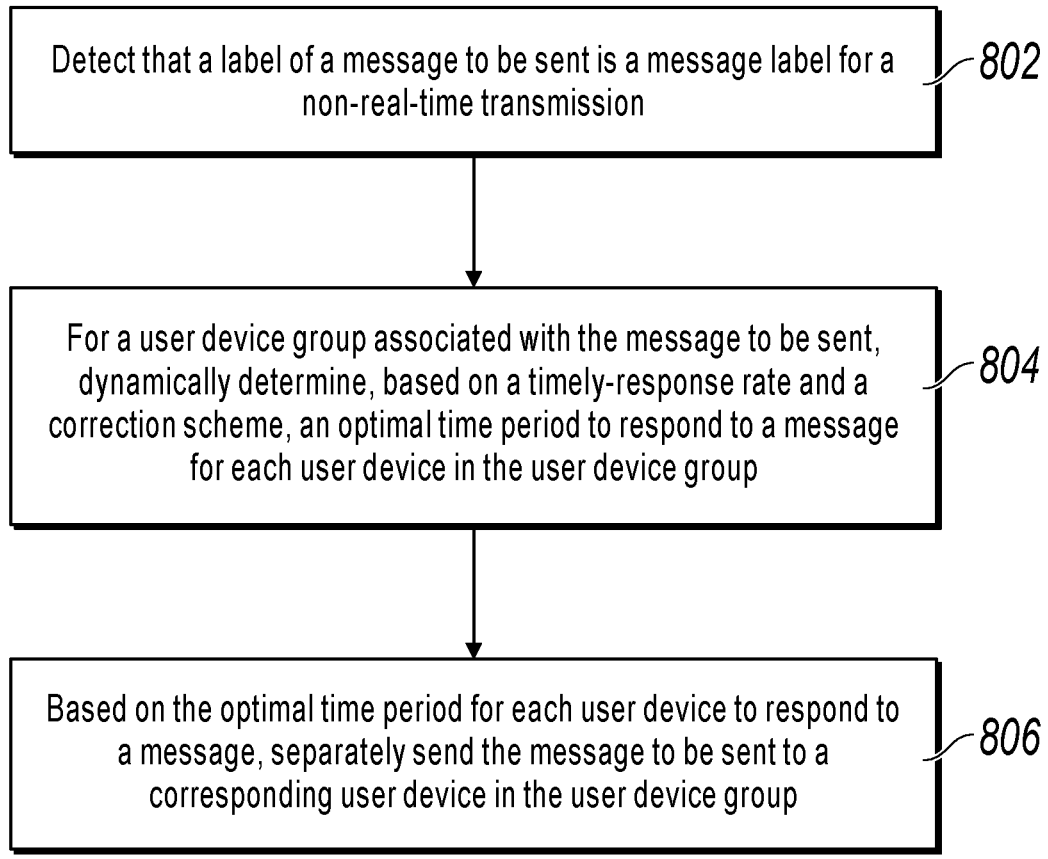
FIG. 8 is a flowchart illustrating an example of a computer-implemented method for pushing an application message, according to an implementation of the present disclosure.

FIG. 8 is a flowchart illustrating an example of a computer-implemented method 800 for pushing an application message, according to an implementation of the present disclosure. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate. In some implementations, various steps of method 800 can be run in parallel, in combination, in loops, or in any order.

At 802, a label of a message to be sent is detected as a message label for a non-real-time transmission.

In some implementations, method 800 further comprises: 1) detecting that the label of the message to be sent is a message label for real-time transmission; and 2) sending, in real time and to each user device in the user device group, the message to be sent. From 802, method 800 proceeds to 804.

At 804, for a user device group associated with the message to be sent and based on a timely-response rate and a correction scheme, an optimal time period to respond to a message for each user device in the user device group is dynamically determined.

In some implementations, dynamically determining the optimal time period for each user device in the user device group comprises: 1) predetermining, as a predetermined time interval, a time interval for collecting statistics on the timely-response rate; 2) based on the predetermined time interval, collecting statistics on a number of messages that are received by and a number of messages that are responded to in time by each user device in the user device group in each time interval; 3) determining a timely-response rate for each user device in the user device group in each time interval based on the number of messages that are received by and the number of messages that are responded to in time by each user device in the user device group in each time interval; 4) determining, as the optimal time period, a time interval corresponding to a maximum value of the timely-response rate; 5) correcting, as a corrected timely-response rate and by using the correction scheme to minimize a fluctuation amplitude of the timely-response rate, the timely-response rate for each user device in the user device group in each time interval; and 6) determining, as the optimal time period, a time interval corresponding to a maximum value of the corrected timely-response rate.

In some implementations, method 800 further comprises: if there are multiple maximum values of the timely-response rate for a particular user device in the user device group: 1) separately obtaining, as obtained time intervals, time intervals corresponding to the multiple maximum values of the timely-response rate; and 2) determining, as the optimal time period for the particular user device in the user device group to respond to a message: a) an earliest time interval from the obtained time intervals; or b) a time interval with an optimal network status.

In some implementations, method 800 further comprises: re-determining the optimal time period for a particular user device in the user device group to respond to a message when a determination indicates that the user device group includes the particular user device and the timely-response rate of the particular user device in the optimal time period is lower than a predetermined timely-response rate threshold. From 804, method 800 proceeds to 806.

At 806, based on the optimal time period for each user device to respond to a message, the message to be sent is separately sent to a corresponding user device in the user device group.

In some implementations, separately sending the message to be sent to the corresponding user device in the user device group comprises: based on an identifier of each user device in the user device group, determining an identifier of a sending server corresponding to the identifier of each user device in the user device group, so that the sending server sends, to the corresponding user device in the user device group, the message to be sent.

In some implementations, method 800 further comprises: 1) dividing, based on a predetermined ratio, the user device group into a first user device group and a second user device group; 2) based on the optimal time period for each user device in the first user device group, separately sending the message to be sent to a corresponding user device in the first user device group; 3) randomly sending, to each user device in the second user device group, the message to be sent; 4) collecting statistics on a timely-response rate of each user device in the first user device group in the optimal time period and on a timely-response rate of each user device in the second user device group; and 5) re-determining the optimal time period for each user device in the user device group when determined that a difference between the timely-response rate of each user device in the first user device group in the optimal time period and the timely-response rate of each user device in the second user device group is less than or equal to a predetermined difference threshold. After 806, method 800 can stop.

The described subject matter provides one or more technical effects/advantages over conventional methods for pushing an application message. For example, an advantage of the described subject matter is that based on a user device group of a message to be sent, an optimal time period for each user device in the user device group to respond to a message is determined, that is, the highest-probability time period for tapping a message by each user is obtained. The message to be sent is separately sent to a corresponding user device in the user device group based on the optimal time period for each user device to respond to a message (that is, the highest-probability time period for tapping a message by the user), so that different users receive, at different time points, messages pushed by a system, thereby maximizing a probability of a user tapping a message. A time point preference for tapping a message by a user is also considered, and a time point for receiving a message by the user is customized. By customizing a time point for pushing a message, a probability of a user tapping a message is maximized, thereby improving effectiveness of the message in hitting a target user. Therefore, conventional issues with respect to relatively low timely-response rates in pushing messages as a batch can be alleviated. A change to a time point preference for tapping a message by a user can also be further considered, and an optimal time period for a user device to respond to a message can be adaptively corrected, to ensure effectiveness of a message in hitting a target user.

In conventional technology, the terminal (for example, a mobile phone) receives messages generated by various application back ends or operating systems, and then pushes the received messages to the user in the time period of the highest priority set above. Therefore, message pushing is performed by the terminal. However, the messages are generated not only by the operating systems but also by various application back ends, and it is difficult for the terminal to differentiate between messages with a high timeliness requirement and messages with a low timeliness requirement. For example, messages with a high timeliness requirement such as breaking news and a dynamic account reminder of a payment transaction need to be pushed by the terminal to the user immediately. Conventionally, once the time period of the highest priority is set, the user receives, only in the time period of the highest priority, a received message pushed by the terminal. As such, a message with a high timeliness requirement cannot be pushed to the user in real time, and therefore the user misses the important message requiring timeliness. The described methodology provides an adaptive-adjustment mechanism (increasing flexibility) to more accurately reflect a preference for tapping a message by a user. As a result, users are more likely to not miss an important message requiring timeliness and, for example, efficiency of server operations and network transmissions/bandwidth can be optimized to avoid unnecessary message generation and transmission.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   detecting that a label of a message to be sent is a message label for a non-real-time transmission;
   for a user device group associated with the message to be sent, dynamically determining, based on a timely-response rate and a correction scheme, an initial optimal time period to respond to a message for each device in the user device group;
   dividing, based on a predetermined ratio, the user device group into a first user device group and a second user device group;
   based on the initial optimal time period for each device in the first user device group, separately sending the message to be sent to a corresponding device in the first user device group;
   randomly sending, to each device in the second user device group, the message to be sent;
   collecting statistics on a timely-response rate of each device in the first user device group in the initial optimal time period and on a timely-response rate of each device in the second user device group; and
   re-determining the initial optimal time period for each device in the user device group when determined that a difference between the timely-response rate of each device in the first user device group in the initial optimal time period and the timely-response rate of each device in the second user device group is less than or equal to a predetermined difference threshold.

2. The computer-implemented method of claim 1, wherein dynamically determining the initial optimal time period for each device in the user device group to respond to the message to be sent further comprises:
   establishing a predetermined time interval for collecting statistics on the timely-response rate;
   collecting, based on the predetermined time interval, statistics on messages received, which the predetermined time interval, and statistics on messages responded to, within the predetermined time interval, by each device in the user device group;
   deriving the timely-response rate for each device in the user device group, within the predetermined time interval, based on the statistics on message received and the statistics on messages responded to, within the predetermined time interval, by each device in the user device group; and determining, as the initial optimal time period, a time interval corresponding to a maximum value of the timely-response rate.

3. The computer-implemented method of claim 2, further comprising:
when there are multiple maximum values of the timely-response rate for a particular device in the user device group:
separately obtaining, as obtained time intervals, time intervals corresponding to the multiple maximum values of the timely-response rate; and
determining, as the initial optimal time period for the particular device in the user device group to respond to a message:
an earliest time interval from the obtained time intervals; or
a time interval with an optimal network status.

4. The computer-implemented method of claim 1, further comprising:
detecting that the label of the message to be sent is a message label for real-time transmission; and
sending, in real time and to each device in the user device group, the message to be sent.

5. The computer-implemented method of claim 1, wherein separately sending the message to be sent to the corresponding device in the first user device group comprises:
based on an identifier of each device in the first user device group, determining an identifier of a sending server corresponding to the identifier of each device in the first user device group, so that the sending server sends, to the corresponding device in the first user device group, the message to be sent.

6. The computer-implemented method of claim 1, wherein dynamically determining the initial optimal time period for each device in the user device group to respond to the message to be sent further comprises:
establishing a predetermined time interval for collecting statistics on the timely-response rate;
correcting, as a corrected timely-response rate and by using the correction scheme to minimize a fluctuation amplitude of the timely-response rate, the timely-response rate, within the predetermined time interval, for each device in the user device group; and
determining, as the initial optimal time period, a time interval corresponding to a maximum value of the corrected timely-response rate.

7. A non-transitory, computer-readable medium storing one or more instructions executable by a computer system to perform operations comprising:
detecting that a label of a message to be sent is a message label for a non-real-time transmission;
for a user device group associated with the message to be sent, dynamically determining, based on a timely-response rate and a correction scheme, an initial optimal time period to respond to a message for each device in the user device group;
dividing, based on a predetermined ratio, the user device group into a first user device group and a second user device group;
based on the initial optimal time period for each device in the first user device group, separately sending the message to be sent to a corresponding device in the first user device group;
randomly sending, to each device in the second user device group, the message to be sent;
collecting statistics on a timely-response rate of each device in the first user device group in the initial optimal time period and on a timely-response rate of each device in the second user device group; and
re-determining the initial optimal time period for each device in the user device group when determined that a difference between the timely-response rate of each device in the first user device group in the initial optimal time period and the timely-response rate of each device in the second user device group is less than or equal to a predetermined difference threshold.

8. The non-transitory, computer-readable medium of claim 7, wherein dynamically determining the initial optimal time period for each device in the user device group to respond to the message to be sent further comprises:
establishing a predetermined time interval for collecting statistics on the timely-response rate;
collecting, based on the predetermined time interval, statistics on messages received, which the predetermined time interval, and statistics on messages responded to, within the predetermined time interval, by each device in the user device group;
deriving the timely-response rate for each device in the user device group, within the predetermined time interval, based on the statistics on message received and the statistics on messages responded to, within the predetermined time interval, by each device in the user device group; and
determining, as the initial optimal time period, a time interval corresponding to a maximum value of the timely-response rate.

9. The non-transitory, computer-readable medium of claim 8, further comprising:
when there are multiple maximum values of the timely-response rate for a particular device in the user device group:
separately obtaining, as obtained time intervals, time intervals corresponding to the multiple maximum values of the timely-response rate; and
determining, as the initial optimal time period for the particular device in the user device group to respond to a message:
an earliest time interval from the obtained time intervals; or
a time interval with an optimal network status.

10. The non-transitory, computer-readable medium of claim 7, further comprising:
detecting that the label of the message to be sent is a message label for real-time transmission; and
sending, in real time and to each device in the user device group, the message to be sent.

11. The non-transitory, computer-readable medium of claim 7, wherein separately sending the message to be sent to the corresponding device in the first user device group comprises:
based on an identifier of each device in the first user device group, determining an identifier of a sending server corresponding to the identifier of each device in the first user device group, so that the sending server sends, to the corresponding device in the first user device group, the message to be sent.

12. The non-transitory, computer-readable medium of claim 7, wherein dynamically determining the initial optimal time period for each device in the user device group to respond to the message to be sent further comprises:
establishing a predetermined time interval for collecting statistics on the timely-response rate;

correcting, as a corrected timely-response rate and by using the correction scheme to minimize a fluctuation amplitude of the timely-response rate, the timely-response rate, within the predetermined time interval, for each device in the user device group; and determining, as the initial optimal time period, a time interval corresponding to a maximum value of the corrected timely-response rate.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

detecting that a label of a message to be sent is a message label for a non-real-time transmission;

for a user device group associated with the message to be sent, dynamically determining, based on a timely-response rate and a correction scheme, an initial optimal time period to respond to a message for each device in the user device group;

dividing, based on a predetermined ratio, the user device group into a first user device group and a second user device group;

based on the initial optimal time period for each device in the first user device group, separately sending the message to be sent to a corresponding device in the first user device group;

randomly sending, to each device in the second user device group, the message to be sent;

collecting statistics on a timely-response rate of each device in the first user device group in the initial optimal time period and on a timely-response rate of each device in the second user device group; and re-determining the initial optimal time period for each device in the user device group when determined that a difference between the timely-response rate of each device in the first user device group in the initial optimal time period and the timely-response rate of each device in the second user device group is less than or equal to a predetermined difference threshold.

14. The computer-implemented system of claim 13, wherein dynamically determining the initial optimal time period for each device in the user device group to respond to the message to be sent further comprises:

establishing a predetermined time interval for collecting statistics on the timely-response rate;

collecting, based on the predetermined time interval, statistics on messages received, which the predetermined time interval, and statistics on messages responded to, within the predetermined time interval, by each device in the user device group;

deriving the timely-response rate for each device in the user device group, within the predetermined time interval, based on the statistics on message received and the statistics on messages responded to, within the predetermined time interval, by each device in the user device group; and determining, as the initial optimal time period, a time interval corresponding to a maximum value of the timely-response rate.

15. The computer-implemented system of claim 14, further comprising:

when there are multiple maximum values of the timely-response rate for a particular device in the user device group:

separately obtaining, as obtained time intervals, time intervals corresponding to the multiple maximum values of the timely-response rate; and determining, as the initial optimal time period for the particular device in the user device group to respond to a message:

an earliest time interval from the obtained time intervals; or a time interval with an optimal network status.

16. The computer-implemented system of claim 13, wherein separately sending the message to be sent to the corresponding device in the first user device group comprises:

based on an identifier of each device in the first user device group, determining an identifier of a sending server corresponding to the identifier of each device in the first user device group, so that the sending server sends, to the corresponding device in the first user device group, the message to be sent.

17. The computer-implemented system of claim 13, further comprising:

detecting that the label of the message to be sent is a message label for real-time transmission; and sending, in real time and to each device in the user device group, the message to be sent.

18. The computer-implemented system of claim 13, wherein dynamically determining the initial optimal time period for each device in the user device group to respond to the message to be sent further comprises:

establishing a predetermined time interval for collecting statistics on the timely-response rate;

correcting, as a corrected timely-response rate and by using the correction scheme to minimize a fluctuation amplitude of the timely-response rate, the timely-response rate, within the predetermined time interval, for each device in the user device group; and determining, as the initial optimal time period, a time interval corresponding to a maximum value of the corrected timely-response rate.

\* \* \* \* \*